US 6,739,401 B1

(12) United States Patent  (10) Patent No.: US 6,739,401 B1
Sova  (45) Date of Patent: May 25, 2004

(54) HOLE CUTTING DEVICE (76) Inventor: Chris A. Sova, 4425 Cycad La., Boynton Beach, FL (US) 33436-7320

( * ) Notice: Subject to any disclaimer, the term of this patent is extended or adjusted under 35 U.S.C. 154(b) by 0 days.

(21) Appl. No.: 10/364,018

(22) Filed: Feb. 10, 2003

(51) Int. Cl.[7] .............................................. A01B 45/04
(52) U.S. Cl. ........................... 172/22; 172/25; 111/106
(58) Field of Search ............................ 172/21, 22, 25, 172/96; 111/106

(56) References Cited

U.S. PATENT DOCUMENTS

| 1,812,427 | A | * | 6/1931 | Bergmann | 111/7.4 |
|---|---|---|---|---|---|
| 3,797,577 | A | * | 3/1974 | Killion et al. | 172/22 |
| 3,830,310 | A | * | 8/1974 | Williams | 172/22 |
| 4,466,490 | A | * | 8/1984 | Eckels | 171/50 |
| 4,964,472 | A | * | 10/1990 | Cleworth | 171/11 |
| 5,088,562 | A | * | 2/1992 | Shields | 172/22 |
| 5,154,466 | A | * | 10/1992 | Neuhaus | 294/50.9 |
| 5,338,078 | A | * | 8/1994 | Basek | 294/50.5 |
| 5,370,069 | A | * | 12/1994 | Monroe | 111/127 |
| 5,398,624 | A | * | 3/1995 | Caron | 111/106 |
| 6,561,115 | B2 | * | 5/2003 | Chase | 114/294 |

* cited by examiner

Primary Examiner—Robert E. Pezzuto
Assistant Examiner—Alexandra K. Pechhold
(74) Attorney, Agent, or Firm—Robert M. Downey, P.A.

(57) ABSTRACT

A hole cutting device for forming and relocating holes in the ground includes a hollow cylindrical cutting head with a lower cutting edge surrounding an open bottom, a tubular shaft extending upwardly from the cylindrical head and a handle portion on an upper end of the shaft. Upon forcing the cutting head downwardly into the ground, a turf and soil plug fills the interior of the head. An air delivery system, operable at the handle portion, injects a charge of air at the bottom of the soil plug upon removal from the ground, thereby eliminating vacuum suction and allowing the soil plug to be removed intact without breaking or disintegrating. Once the cutting head is removed from the formed hole, a hinged lever on the shaft forces a push plate within the cutting head downwardly towards the open end to eject the plug therefrom. If desired, the plug may be deposited into a previously formed hole.

16 Claims, 6 Drawing Sheets

HOLE CUTTING DEVICE

BACKGROUND OF THE INVENTION

1. Field of the Invention

This invention relates to a turf and soil hole cutter and, more particularly, to a hole cutting device for forming and relocating holes, such as in a putting green, and including means for preventing vacuum suction from hindering removal of the soil plug from the ground.

2. Discussion of the Related Art

Golf cup hole cutters of various types and construction are well known in the art. Of particular relevance to this invention is the well known and widely used lever extraction hole cutter which includes a cylindrical cutting head, an elevated T-shaped handle and a pivoting lever assembly for urging a push plate downwardly through the interior of the cylindrical cutting head to forcibly eject a soil plug from the open bottom end of the cutting head. The use and operation of conventional hole cutters of this type are accompanied by various drawbacks. In particular, an airlock or vacuum suction is often created between the bottom of the plug and the surrounding earth as the plug is withdrawn from the ground. When this happens, the soil plug may partially crumble or disintegrate, causing a portion of the soil plug to remain in the hole when the cylindrical cutting head is removed from the ground. The remaining soil from the unremoved portion of the plug must then be scooped out by hand using a small shovel or scooping tool. The need to remove the remaining portion of the soil plug from the hole by hand increases the degree of human error as well as the amount of time and labor required to perform the task of cutting and relocating holes in the putting greens of a golf course.

Once the hole is cut and the plug is removed from the ground, a cup that supports the flagstick is placed in the hole. The proper depth measured between the top edge of the cup to the top of the ground surface (i.e. the top turf putting surface) is ¾ of an inch. If the plug is not removed intact, requiring removal of the remaining soil plug by hand, the proper hole depth is difficult to achieve. For instance, if too much soil is removed by hand, the cup that is placed in the hole will be too deep, leaving a large gap between the top edge of the cup and the turf surface. This results in poor support around the edge of the hole. Without sufficient support from the cup, the soil is prone to break apart around the top of the hole, below the turf, making the hole larger and out of shape. On the other hand, if not enough soil is removed by hand, the top of the cup will be too close to the turf surface edge surrounding the hole. This causes the golf ball to hit the top edge of the cup or a raised lip in the turf and either bounce back away from the hole or roll around the outside of the lip rather than rolling smoothly and dropping into the hole.

In an attempt to introduce air under the soil plug to prevent vacuum suction, maintenance workers using the conventional lever extraction hole cutter often move the hole cutter from side to side in order to create an airway from the top of the hole and down along the outer side of the cylindrical cutting head to the bottom of the plug. This causes the soil around the top surface edge of the hole to be pushed up, resulting in the golf ball ringing around the hole instead of rolling smoothing and dropping into the hole. Moving the hole cutter from side to side also increases the size of the hole and prevents the cup from fitting tightly into the cut hole. As a result, the cup is unable to support the flagstick properly. Moreover, when the flagstick is lifted and removed in order to putt, the loose fitting cup is often pulled out of the hole along with the flagstick.

OBJECTS AND ADVANTAGES OF THE INVENTION

Considering the foregoing problems associated with the use of conventional hole cutters, it is a primary object of the present invention to provide a hole cutting device for forming and relocating holes and which includes means to eliminate vacuum suction below the resultant soil plug, thereby allowing the soil plug to be removed from the ground intact and without breaking or disintegrating.

It is a further object of the present invention to provide a hole cutter device which delivers air to the bottom of a soil plug being removed, thereby eliminating the need to move the hole cutter from side to side and allowing easy formation of a uniform diameter hole having a desired predetermined depth.

It is still a further object of the present invention to provide a hole cutter device for forming and relocating holes in a putting green which reduces labor and human error.

It is yet a further object of the present invention to provide a hole cutting device for forming and relocating holes in a golf putting green which cuts and forms a uniform hole of desired depth, thereby allowing the cup to fit properly in the hole, and further allowing a golf ball to roll smoothly and drop into the hole without interference or misdirection.

It is yet a further object of the present invention to provide a hole cutting device for putting greens which reduces the number of golfer complaints concerning irregularities and imperfections on putting greens.

It is still a further object of the present invention to provide a hole cutting device for golf putting greens which cuts and forms a uniform hole of desired diameter and depth, and which thereby allows a cup to be securely and accurately set within the hole at the desired depth.

It is still a further object of the present invention to provide a hole cutting device for golf greens which eliminates vacuum suction upon removal of a soil plug, thereby allowing holes to be cut and relocated in putting greens in wet conditions.

It is still a further object of the present invention to provide a hole cutting device for golf putting greens which saves time and reduces the number of tools necessary to cut and relocate holes in a putting green.

It is still a further object of the present invention to provide a hole cutting device for putting greens which is simple to use by less skilled maintenance workers, thereby making it easier to train new employees of a greens keeper crew on a golf course.

These and other objects and advantages of the present invention will be more readily apparent with reference to the following detailed description and accompanying drawings.

SUMMARY OF THE INVENTION

The present invention is directed to a hole cutting device for forming and relocating holes in the ground includes a hollow cylindrical cutting head with a lower cutting edge surrounding an open bottom, a tubular shaft extending upwardly from the cylindrical head and a handle portion on an upper end of the shaft. Upon forcing the cutting head downwardly into the ground, utilizing handgrips on the handle portion, a push plate within the cylindrical cutting head is forced upwardly to an elevated position as the resultant turf and soil plug fills the interior of the head. An air delivery system, operable at the handle portion, injects a charge of air at the bottom of the soil plug upon removal from the ground, thereby eliminating vacuum suction and allowing the soil plug to be removed intact without breaking or disintegrating. Once the cutting head is removed from the formed hole, a hinged lever on the shaft forces the push plate downwardly towards the open end of the cutting head to eject the plug therefrom. If desired, the plug may be deposited into a previously formed hole to fill the hole.

BRIEF DESCRIPTION OF THE DRAWING

For a fuller understanding of the nature of the present invention, reference should be made to the following detailed description taken in conjunction with the accompanying drawings in which:

FIG. 8b is an isolated view, in partial cross-section, showing the air supply mechanism in the handle portion of the embodiment of FIG. 8a.

Like reference numerals refer to like parts throughout the several views of the drawings.

DETAILED DESCRIPTION OF THE PREFERRED EMBODIMENTS

Figure 2:
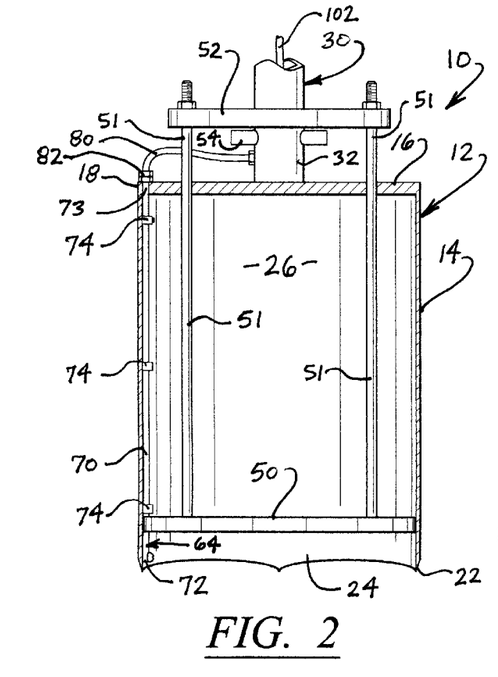
FIG. 2 is an isolated front elevational view, in partial cross-section, illustrating the cylindrical cutting head of the hole cutting device of the present invention.
Figure 3:
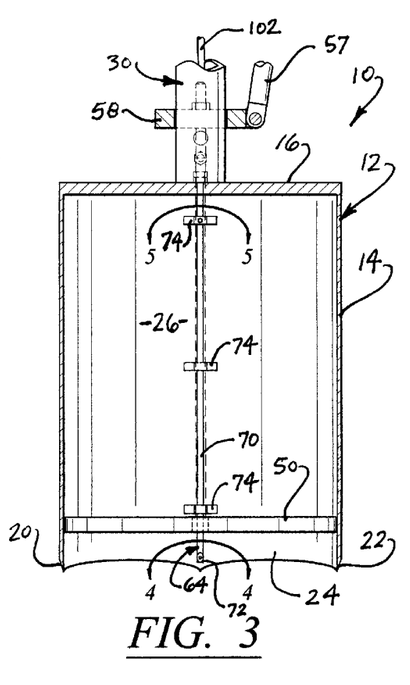
FIG. 3 is an isolated side elevational view, in partial cross-section, illustrating the cylindrical cutting head.
Figure 4A:
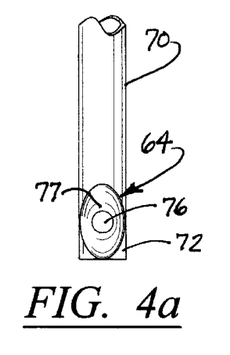
FIG. 4a is an isolated front elevational view, in cutaway, showing a bottom nozzle end of an air injection tube within the cylindrical cutting head.
Figure 4B:
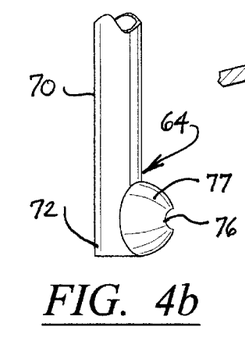
FIG. 4b is an isolated side elevational view, in cutaway, showing the nozzle end of the air injection tube.

Referring to the several views of the drawings, and initially FIGS. 1a–1e, the hole cutting device of the present invention is shown and generally indicated as 10. The hole cutting device 10 includes a hollow cutting head 12 defined by a surrounding side wall structure 14 with a top wall 16 on an upper end 18 of the side wall structure and a cutting edge 22 formed around a lower end 22 of the side wall structure. The cutting edge 22 surrounds a open bottom 24 which communicates with a hollow interior 26 of the cutting head 12. The hollow interior 26 extends from the open bottom 24 to the top wall 16 and is surrounded by the side wall structure 14. In a preferred embodiment, the side wall structure is cylindrical and is formed of a hardened steel, aluminum or other metal alloy material. The cutting edge 22 is preferably scalloped, as best seen in FIGS. 2 and 3, to promote slicing through the turf and underlying soil, clay or other ground material with less resistance.

An elongate shaft 30 is attached to the cutting head 12 and extends upwardly therefrom, preferably in axial alignment with the central longitudinal axis of the cylindrical cutting head. In a preferred embodiment, a lower end 32 of the shaft 30 is fixed to the top wall 16 of the cutting head 12 by welding, brace members, a locking collar, or other suitable hardware in a manner which is generally known in the art. An upper end 34 of the shaft 30 is structured and disposed for supporting a handle portion 40 thereon. The handle portion 40 is fixedly attached to the upper end 34 of the shaft 30 by welding, set screws, or other well known methods of attachment. In a preferred embodiment, the shaft 30 is hollow and has a tubular structure. The upper end portion 34 of the shaft may have a larger diameter than a remainder of the shaft to accommodate attachment of the handle portion 40. In the various embodiments, as described hereinafter, the handle portion 40 includes opposing left and right handgrip members 44, 46 extending outwardly on opposite sides of a longitudinal axis of the shaft 30. In a preferred embodiment, the left and right handgrip members 44, 46 extend generally perpendicular to the longitudinal axis of the shaft. The handgrip members 44, 46 are preferably of a handlebar design and may be provided with an rubber or like grip material on the outer surface to provide a comfortable and secure grip when holding the device 10 in the left and right hands and applying a downward force and upward lifting force, as shown and described hereinafter.

The cutting head 12 is specifically structured and disposed to be forced down into the ground G so that a plug P of ground material fills within the hollow interior of the cutting head 12. Once the cutting head 12 is removed from the ground G, leaving a uniform hole of a predetermined depth, an ejection mechanism is operated to push the removed plug P out through the open bottom 24 of the cutting head 12. In a preferred embodiment, the ejection mechanism includes a push plate 50 moveably captivated within the hollow interior of the cutting head and extending generally transversely through the hollow interior in perpendicular relation to the longitudinal axis of the cutting head and shaft. Rods 51 fixed to the top side of the push plate extend upwardly through the top wall 16 of the cutting head and are fixed at an opposite end to a sliding cross brace 52 slidably carried on the shaft 30. The cross brace 52 is moveable through a range of movement on the shaft, permitting corresponding movement of the push plate 50 due to the fixed attachment to the cross brace using the rods 51. Downward movement of the cross brace 52 on the shaft and, accordingly, downward movement of the push plate within the hollow interior 26 towards the cutting edge 22 and open bottom 24, is limited by stop member 54 fixed on the lower end of the shaft 30, in spaced relation above the top wall 16 of the cutting head, as best seen in FIG. 2. The ejection mechanism further includes a lever 56 pivotally fixed to the shaft, preferably on the upper portion of the shaft. A linking arm 57 pivotally connects between the end 56*b* of the lever 56 and a sliding collar 58 on the shaft. When the plug P of ground material is filled within the hollow interior of the cutting head 12, the push plate 50 is forced up towards the top wall 16 and the cross brace 52 is slidably advanced up the shaft and into engagement with the sliding collar 58. By grasping the handle end 56*a* of the lever 56 and pulling upwardly to cause the lever to pivot, the linking arm 57 urges the sliding collar 58 downwardly against the cross brace 52, causing the cross brace 52 to slide down the shaft 30 as the push plate 50 is moved through a range of movement within the hollow interior of the cutting head from a raised position and downwardly towards the open end 24, thereby forcibly ejecting the plug P outwardly from the open bottom of the cutting head.

The various embodiments of the hole cutting device 10 of the present invention are provided with an air delivery system 60 for injecting a charge of air at the bottom of the plug P upon removing the plug from the ground, thereby eliminating vacuum suction and allowing the soil plug P to be removed intact without breaking or disintegrating. In the various preferred embodiments, as described hereinafter, the air delivery system 60 is preferably operable at the handle portion 40 to release the charge of air from a pressurized air source 62 and to a nozzle fixture 64 supported on the cutting head 12. In the preferred embodiments, the discharge of the air from the nozzle fixture 64 is near the cutting edge 22 so that the charge of air is directed below the soil plug P and throughout an air space created between the bottom of the soil plug P and the surrounding earth S when the cutting head and soil plug move upwardly from the ground G.

Figure 1A:
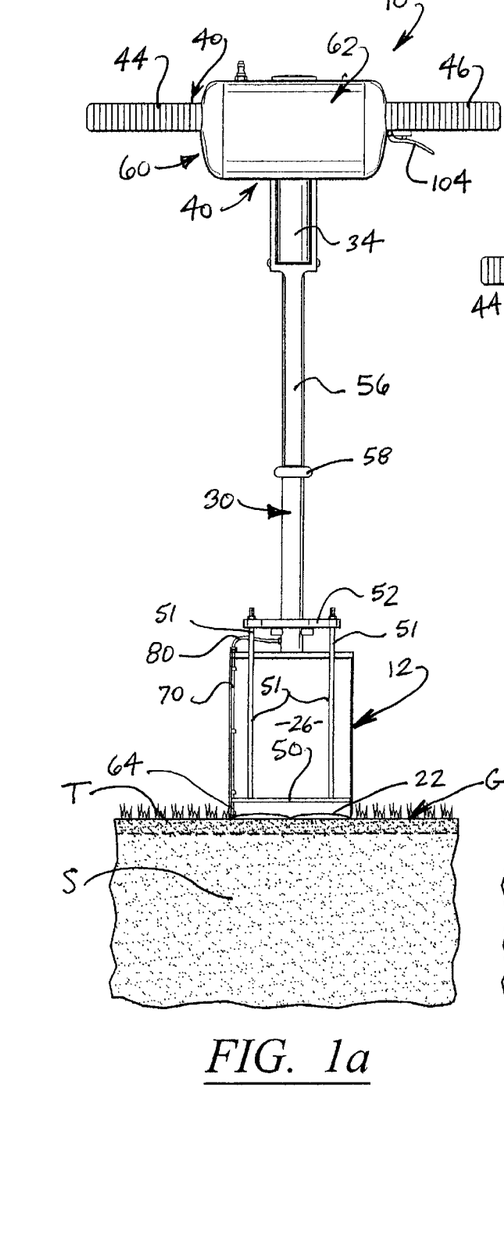
FIGS. 1a–1e show a side elevational view of the hole cutting device of the present invention illustrating a sequence of operations to cut a hole, remove a turf and soil plug, and replace the plug in a previously cut hole of a golf putting green using the hole cutting device of the present invention.
Figure 1B:
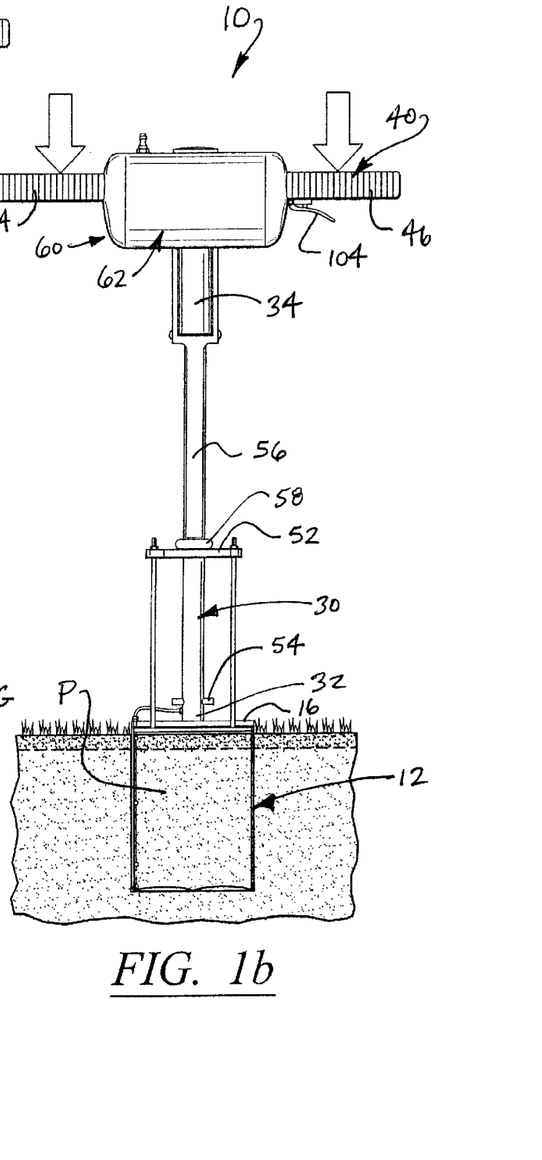
Figure 1C:
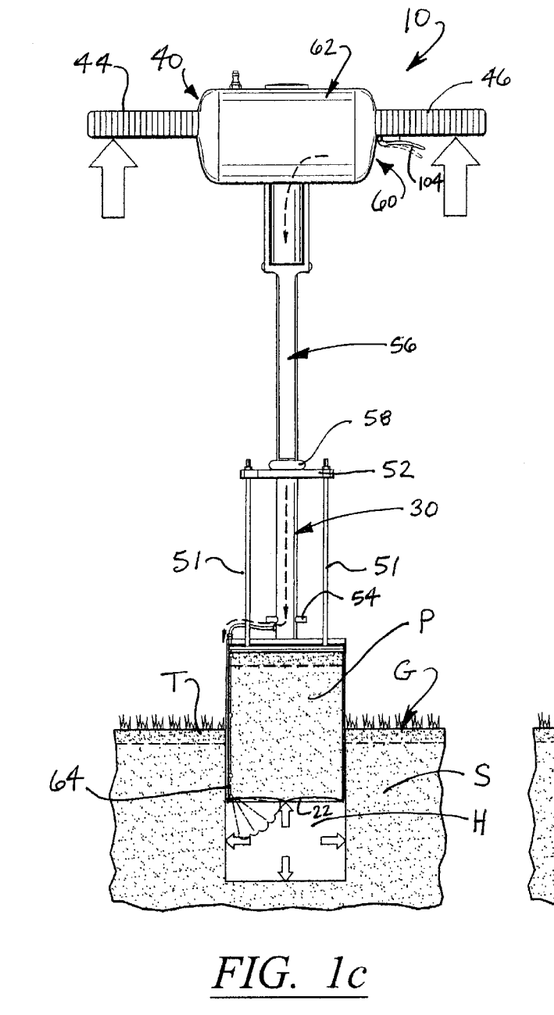
Figure 1D:
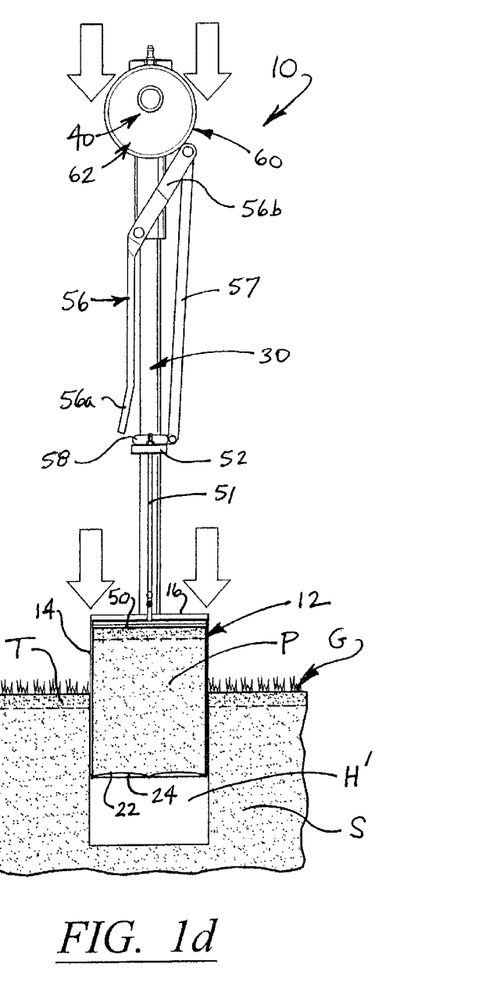
Figure 1E:
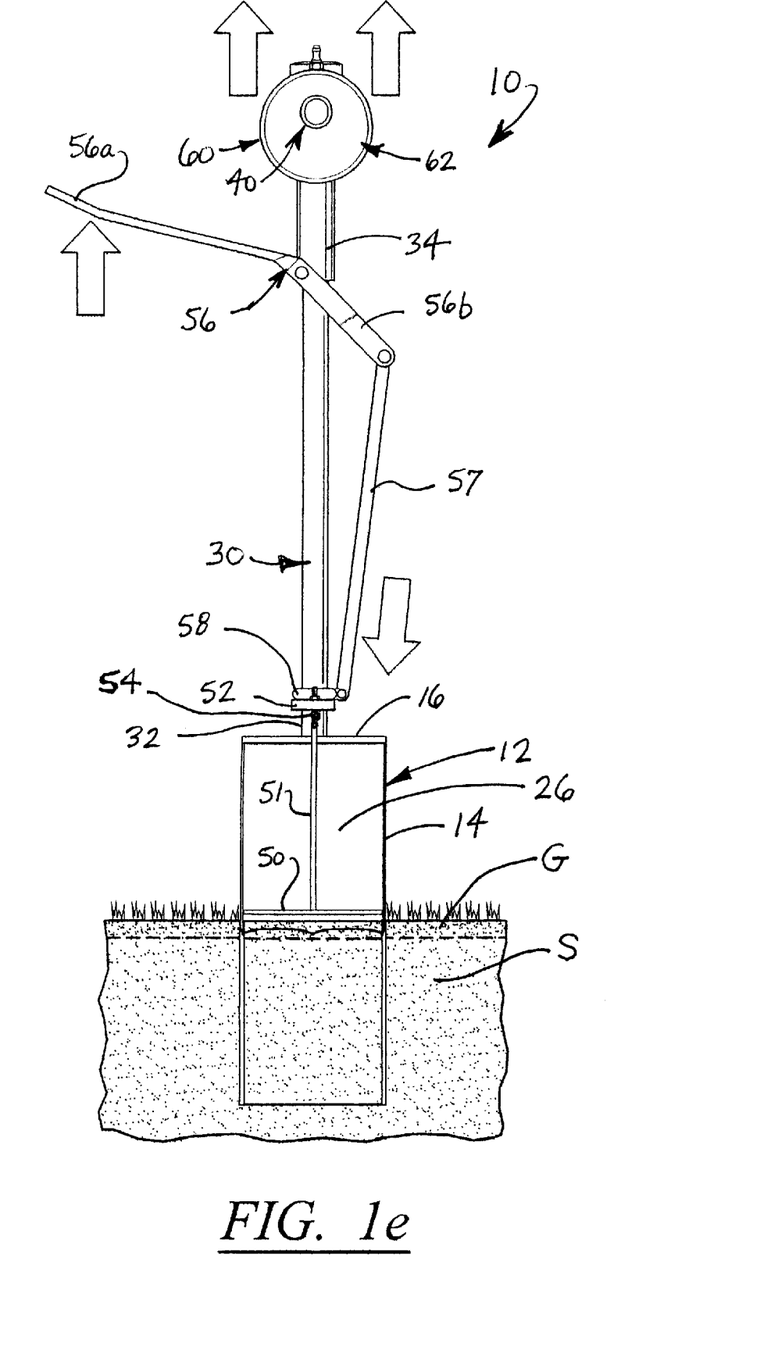

Referring to FIGS. 1*a*–1*e*, a sequence of operation of the hole cutting device 10 for forming and relocating a hole H in the ground G, such as on a golf course putting green, is shown. As seen in FIG. 1*a*, the cutting of a new hole H into the ground G using the device 10 is initiated by first placing the cutting edge 22 and open bottom end 24 of the cutting head 12 at the desired location on the ground surface T (e.g. grass, turf, or the like) and maintaining the device 10 upright so that the longitudinal axis of the shaft 30 is perpendicular to the plane of the ground surface. Then, while maintaining the device 10 in the perfectly upright position, as seen in FIG. 1*a*, a downward force is applied with the left and right arms and hands on the handgrip members 44, 46, as indicated by the arrows in FIG. 1*b*, to urge the cutting edge 22 and side wall structure 14 of the cutting head 12 straight down into the ground G. This allows the cutting edge 22 to slice straight through the turf T and underlying soil S as the turf and soil plug P fills within the hollow interior of the cutting head 12, urging the push plate 50 upwardly towards the top wall 16. It should be noted that the outer surface of the wall structure 14 on the cutting head may be marked to indicate depth of penetration of the cutting head into the ground, thereby allowing the desired depth of hole H to be determined. Once the cutting head 12 has been forced down into the ground to the desired depth, the air delivery system is actuated to deliver the charge of air below the soil plug. This causes the cutting head 12 and soil plug P to be forced upwardly from the ground due to the pressure exerted by the charge of injected air at the bottom of the plug. The injected air alleviates the vacuum pressure that results upon upward movement and separation of the plug P from the surrounding earth S. The cutting head 12 and soil plug P can then be more easily removed from the ground, lifting the device straight up while grasping the handgrip members. By alleviating the vacuum pressure below the soil plug, during removal, the soil plug remains intact within the hollow interior of the cutting head, throughout the entire removal process. This results in formation of a uniform hole H of desired depth, having a uniform transverse dimension (e.g. diameter) from top to bottom, without disturbing the surrounding ground material, including the turf surface surrounding the formed hole. Next, the cutting head 12, with the intact soil plug P therein, can be inserted into a previously formed hole H, as shown in FIG. 1*d*. Once the cutting head 12 is forced downwardly into the hole H so that the plug P fills the hole and is level with the surrounding ground surface, the handle portion 56*a* of the lever 56 is lifted to force the push plate 50 downwardly within the cutting head, thereby urging the plug P outwardly from the open end 24 of the cutting head, as the device 10 is lifted upwardly from the ground, as seen in FIG. 1*e*.

Figure 5:
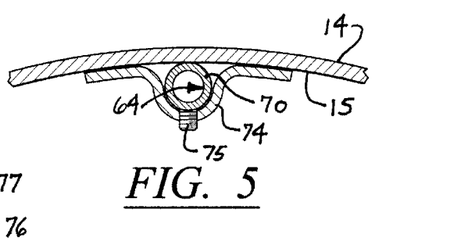
FIG. 5 is an isolated cross-sectional view taken along the plane of the line 5—5 of FIG. 3 illustrating an adjustable mounting of the air injection tube within the cylindrical cutting head.

Referring to FIGS. 2–5, a preferred embodiment of the nozzle 64 is shown. Specifically, a metal tube 70 is secured to the inner wall surface 15 of the side wall structure 14 of the cutting head and extends down through the top wall 16 to a lower distal end 72. The metal tube 70 is adjustably positioned so that the lower distal end 72 is maintained just above the cutting edge 22 at the open bottom end 24 of the cutting head, as best seen in FIG. 2. It is preferred that the distal end 72 be maintained above the cutting edge 22 and within the interior of the cutting head to avoid obstructing the cutting action of the cutting edge through the ground as well as to prevent damage to the nozzle 64. Several braces 74 are used to hold the metal tube 70 on the surface 15 of the side wall structure. The braces 74 maintain the metal tube 70 in vertical alignment and allow sliding movement of the tube relative to the side wall structure of the cutting head, thereby permitting adjustable positioning of the distal end 72. At least one of the braces is provided with a set screw 75, as seen in FIG. 5, which is tightened to engage the metal tube 70. The set screw 75 can be loosened in order to permit sliding, adjusted movement of the metal tube and, accordingly, adjustable positioning of the distal end 72 and nozzle opening 76 within the cutting head. Once the metal tube 70 is properly positioned, the set screw 75 is tightened against the metal tube 70 to secure the metal tube in fixed, adjusted position. The nozzle opening 76 at the lower distal end 72 of the metal tube is shown in FIGS. 4*a* and 4*b*. In a preferred embodiment, the nozzle opening 76 is surrounded by a convex surface 77 in the form of a smooth, generally rounded bump. The nozzle opening 76 is directed inwardly towards the central longitudinal axis of the hollow interior of the cutting head, to discourage soil and other ground material from clogging the opening 76. The rounded surface 77 surrounding the nozzle opening also promotes passage of the nozzle opening 76 and metal tube distal end 72 downwardly through the ground without jarring the metal tube 70 loose or clogging the nozzle opening 76.

A flexible poly tubing 80 extends downwardly from the pressurized air source 62 and through the hollow shaft 30, exiting at the lower end of the shaft, below the stop member 54, as seen in FIG. 2. Thus, the tubing 80 and top end 73 of the metal tube 70 are protected as the stop member 54 prevents the cross brace 52 from crushing the tubing 80 and top end 73 against the top wall 16. The flexible poly tubing 80 connects to the top end 73 of metal tube 70 with the use of a fitting 82. The flexible nature of the tubing 80 allows the metal tube 70 to be adjusted upwardly, so that the top end 73 of the metal tube and fitting 82 may be moved and adjusted relative to the top wall 16 of the cutting head. It should be noted that adjustment of the metal tubing 70, to reposition the distal end 72 of the metal tube and the nozzle opening 76, within the cutting head, may be necessary as the cutting edge 22 wears through use of the device. When it is necessary to sharpen the cutting edge, naturally material will be removed from the lower end 20 of the side wall structure of the cutting head, thereby moving the cutting edge higher and closer to the distal end of the nozzle tube. Accordingly, it may be necessary to adjust the position of the distal end 72 of the nozzle tube 70 and the nozzle opening 76 upwardly so that the distal end and nozzle do not extend beyond the cutting edge 22.

Figure 6:
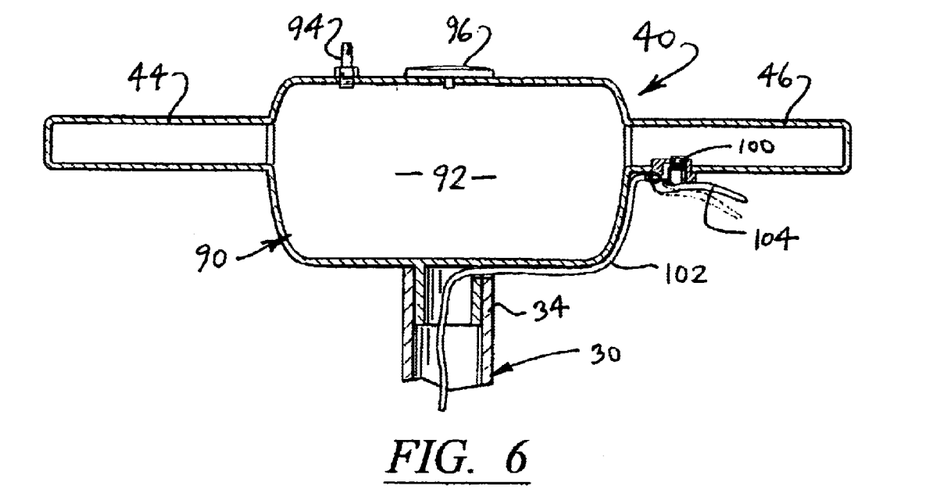
FIG. 6 is an isolated cross-sectional view of the handle portion of the hole cutting device, including a pressurized air tank and handgrips.
Figure 7A:
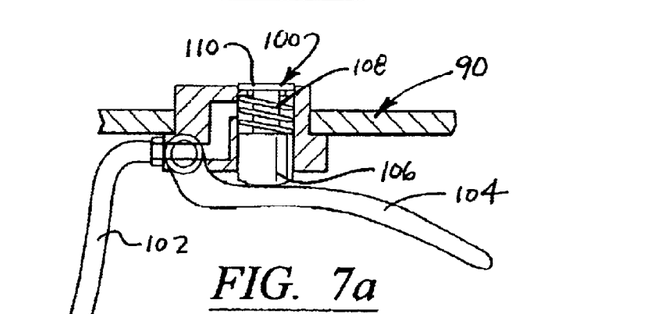
FIG. 7a is an isolated view, in partial cross-section, showing a trigger and valve assembly on the handgrip for releasing a charge of air from the pressurized air tank to the air injection tube in the cylindrical cutting head of the tool.
Figure 7B:
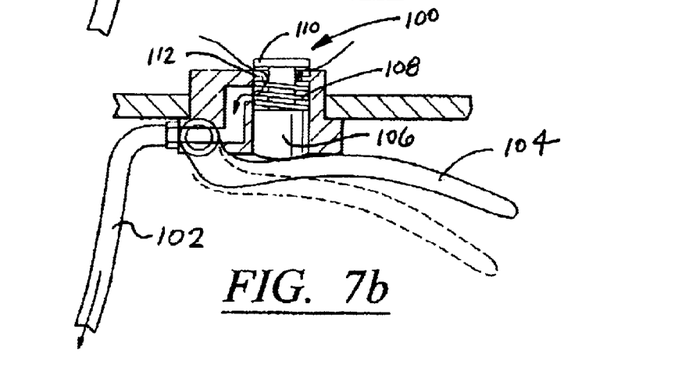
FIG. 7b is an isolated view, in partial cross-section, illustrating operation of the trigger and valve assembly on the handgrip to an open position, thereby releasing a charge of air through a delivery tube and to the air injection nozzle in the cylindrical cutting head.

Referring to FIGS. 6–7b, one preferred embodiment of the air delivery system 60 is shown and includes a pressurized air tank 90 formed within the handle portion 40. As seen in FIG. 6, the pressurized air tank 90 includes an interior chamber 92 which may extend into the handgrip members 44, 46. The air tank 90 is structured to hold a pressurized supply of air up to at least 122 PSI. A valve fitting 94 on the tank permits attachment of an air fill hose extending from an air compressor or other pressurized air-generating source to facilitate filling the interior air chamber of the air tank with a supply of pressurized air. An air pressure gauge 96 is provided on the tank to indicate the air pressure within the interior chamber 92. When the tank is filled to the desired pressure, the fill hose is disconnected from the valve fitting. As seen in FIGS. 7a–7b, a valve mechanism 100 on one of the handgrip members is operable from a closed position to an open position in order to selectively release a charge of air from the interior chamber 92 of the air tank and through a conduit 102 for delivery to the nozzle fixture 64 in the cutting head. The conduit 102 may be a rigid or flexible tubing and connects to or is part of the poly tubing 80 exiting the lower end of the shaft 30. Operation of the valve mechanism 100 is preferably accomplished with the use of a trigger 104 which is conveniently mounted for operation while holding the handgrip member 46. Squeezing the trigger 104 serves to depress the valve button 106 against the spring 108, resulting in the valve head 110 lifting from the valve seat 112 and allowing the pressurized air in the air tank chamber 92 to escape and pass through the valve mechanism 100 and into the conduit 102, as indicated by the arrows in FIG. 7b. It should be noted that the trigger 104 should be squeezed for only a short duration (approximately 1–2 seconds) thereby releasing the charge of pressurized air sufficient to alleviate the vacuum below the soil plug P, without exhausting the entire supply of pressurized air within the tank 90.

Figure 8A:
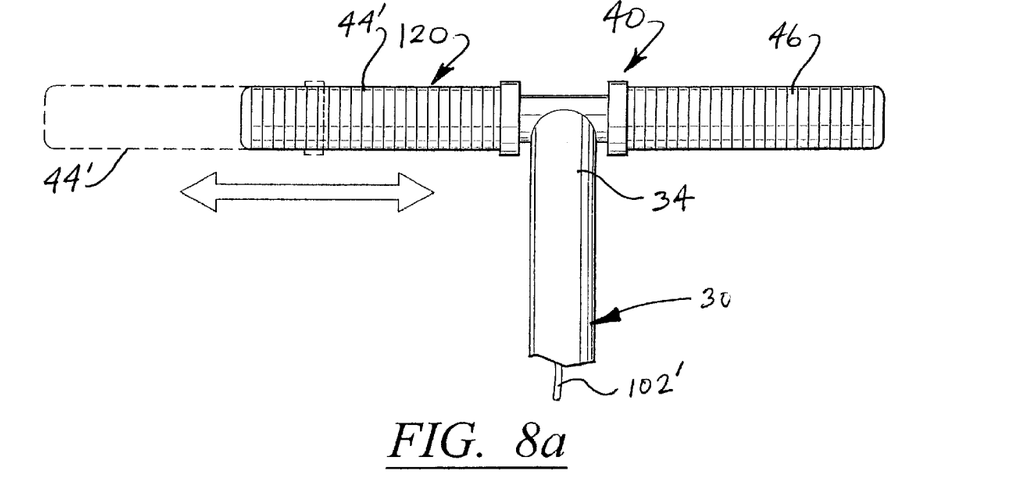
FIG. 8a is an isolated view of the handle portion of the hole cutting device illustrating an alternative embodiment of the air supply mechanism for delivering a charge of air to the nozzle in the cutting head.
Figure 8B:
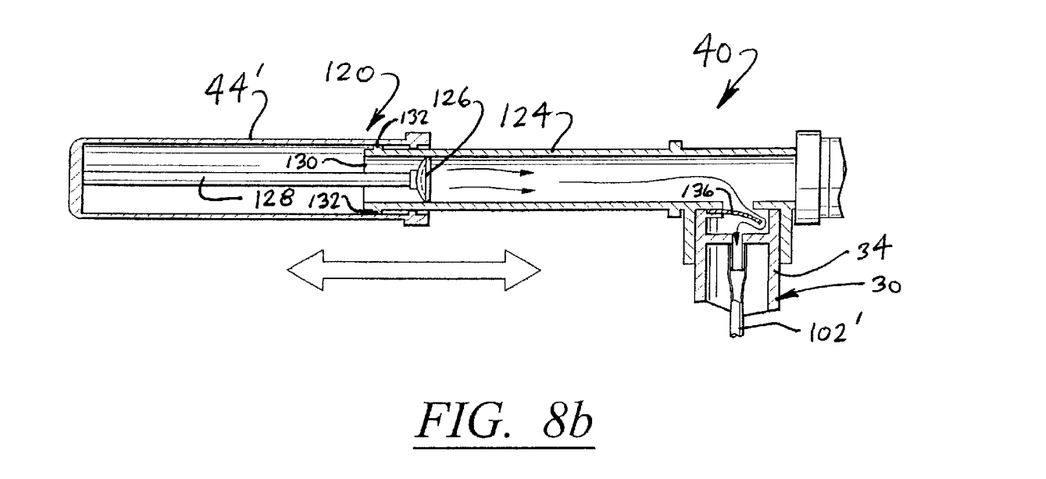

FIGS. 8a–8b illustrate another embodiment of the air delivery system 60 of the present invention. In this particular embodiment, a manually operated pump 120 is provided in the handle portion 40. Specifically, a piston-type pump assembly includes a telescoping handgrip member 44' slidably captivated on the rigid hollow tube 124 of the handle portion 40. As seen in FIGS. 8a and 8b, the handgrip member 44' is telescopically moveable in a reciprocating action, as indicated by the arrows, to cause a flexible diaphragm 126 on the end of rigid rod 128 to be withdrawn and forced forwardly through a portion of the length of the hollow interior of the tube 124. Upon extending the handgrip member 44' outwardly, and withdrawing the diaphragm 126 towards the open end 130 of the tube 124, air is allowed to enter the interior of the hollow tube. A stop member 132 limits outward movement of the handgrip member 44' to prevent separation from the rigid tube 124. Then, upon forcing the handgrip member 44' inwardly towards the center of the handle, the flexible diaphragm 126 forms a seal about the inner cylindrical surface of the tube 124 and, as the diaphragm advances, air is pushed through a check valve 136 and into air delivery conduit 102' leading to the tubing 80 and nozzle fixture 64 in the cutting head. Accordingly, with each complete reciprocating, telescoping action of the handgrip member 44', as illustrated by the arrows in FIGS. 8a and 8b, a charge of air is delivered to the nozzle fixture 64 for release from nozzle opening 76 and into the space below the soil plug being removed from the ground, thereby alleviating the vacuum force and allowing the plug to be removed intact.

While the invention has been shown and described in accordance with preferred and practical embodiments thereof, it is recognized that departures from the instant disclosure are contemplated within the spirit and scope of the invention which is not to be limited, except as defined in the following claims as interpreted under the doctrine of equivalents.

What is claimed is:

1. A device for cutting a hole in the ground comprising:
    a cutting head having an upper end, a lower end, a wall structure extending between said upper end and said lower end, an open bottom communicating with a hollow interior, and a cutting edge surrounding said open bottom and being structured and disposed for forced passage into the ground to cause a plug of ground material to fill within said hollow interior of said cutting head;
    a handle portion;
    a shaft connected to and extending between said cutting head and said handle portion; and
    an air supply system for discharging a charge of air at said cutting head to assist intact removal of the plug from the ground without creating a vacuum suction force.

2. The device as recited in claim 1 further comprising:
    a plate moveably disposed within said hollow interior of said cutting head and being operable from a raised position near said upper end through a range of downward movement towards said open bottom for urging the plug outwardly from said open end.

3. The device as recited in claim 2 wherein said air supply system includes a nozzle within said hollow interior of said cutting head for discharging said charge of air.

4. The device as recited in claim 3 wherein said nozzle is positioned and disposed above said cutting edge and within said hollow interior of said cutting head.

5. The device as recited in claim 4 wherein said air supply system further comprises:
    an air tank for holding a pressurized supply of air;
    a conduit extending between said air tank and said nozzle for delivering said charge of air from said air tank to said nozzle; and
    a valve mechanism selectively operable to release said charge of air from said air tank and through said conduit.

6. The device as recited in claim 5 further comprising a trigger for selectively operating said valve mechanism from a closed position to an open position to release said charge of air from said air tank and through said conduit.

7. The device as recited in claim 4 wherein said air supply system comprises:
    a hand operated pump;
    an air delivery conduit extending between said pump and said nozzle for delivering said charge of air from said pump to said nozzle.

8. The device as recited in claim 4 further comprising nozzle adjustment means for adjusting the position of said nozzle within said hollow interior of said cutting head relative to said cutting edge.

9. The device as recited in claim 2 wherein said wall structure of said cutting head is cylindrical.

10. The device as recited in claim 2 wherein said handle portion includes opposing left and right handgrip members extending outwardly on opposite sides of a longitudinal axis of said shaft, and said left and right handgrip members being structured and disposed for applying a downward force to said shaft and said cutting head in order to force said cutting edge and said wall structure straight down into the ground, and said left and right handgrip members being further structured and disposed to facilitate lifting of said cutting head straight up from the ground to remove the plug.

11. The device as recited in claim 10 wherein said air supply system further comprises:

an air tank for holding a pressurized supply of air;

a nozzle within said hollow interior of said cutting head for discharging said charge of air;

a conduit extending between said air tank and said nozzle for delivering said charge of air from said air tank to said nozzle;

a valve mechanism selectively operable to release said charge of air from said air tank and through said conduit and to said nozzle for discharge therefrom; and a trigger on said handle portion and operable while holding one of said handgrip members for selectively operating said valve mechanism from a closed position to an open position in order to release said charge of air from said air tank and through said conduit to said nozzle.

12. The device as recited in claim 10 wherein said air supply system further comprises:

a manually operated pump within said handle portion for generating said charge of air;

a nozzle within said hollow interior of said cutting head for discharging said charge of air;

an air delivery conduit extending between said pump and said nozzle for delivering said charge of air from said pump to said nozzle; and one of said handgrip members being operable in a reciprocating action to operate said pump to generate said charge of air.

13. The device as recited in claim 2 further comprising a lever pivotally connected to said shaft and operatively engaging said plate, and said lever being operable to move said plate through said range of downward movement towards said open bottom for urging the plug outwardly from said open end.

14. A device for cutting a hole in the ground comprising:

a cutting head having an upper end, a lower end, a wall structure extending between said upper end and said lower end, an open bottom communicating with a hollow interior, and a cutting edge surrounding said open bottom and being structured and disposed for forced passage into the ground to cause a plug of ground material to fill within said hollow interior of said cutting head;

a handle portion supported above said cutting head; and an air supply system for discharging a charge of air at said cutting head to assist intact removal of the plug from the ground.

15. The device as recited in claim 14 wherein said air supply system further comprises:

an air tank for holding a pressurized supply of air;

a nozzle within said hollow interior of said cutting head for discharging said charge of air;

a valve mechanism selectively operable to release said charge of air from said air tank and to said nozzle; and a trigger for selectively operating said valve mechanism to release said charge of air from said air tank and to said nozzle for discharge therefrom.

16. The device as recited in claim 14 wherein said air supply system further comprises:

a manually operated pump for generating said charge of air;

a nozzle on said cutting head for discharging said charge of air; and an air delivery conduit extending between said pump and said nozzle for delivering said charge of air from said pump to said nozzle.

* * * * *